(12) United States Patent
Pilby

(10) Patent No.: US 10,216,066 B2
(45) Date of Patent: Feb. 26, 2019

(54) FLEXIBLE LIGHT CONTROL GRID WITH COLLAPSIBLE FRAME

(71) Applicant: Stephen Pilby, Edmonton Alberta (CA)

(72) Inventor: Stephen Pilby, Edmonton Alberta (CA)

( * ) Notice: Subject to any disclaimer, the term of this patent is extended or adjusted under 35 U.S.C. 154(b) by 288 days.

(21) Appl. No.: 14/523,797

(22) Filed: Oct. 24, 2014

(65) Prior Publication Data

US 2015/0117030 A1    Apr. 30, 2015

Related U.S. Application Data

(60) Provisional application No. 61/895,358, filed on Oct. 24, 2013.

(51) Int. Cl.
| | |
|---|---|
| *F21V 11/00* | (2015.01) |
| *F21V 11/06* | (2006.01) |
| *G03B 15/06* | (2006.01) |

(52) U.S. Cl.
CPC .............. *G03B 15/06* (2013.01); *F21V 11/00* (2013.01); *F21V 11/06* (2013.01); *F21V 11/065* (2013.01)

(58) Field of Classification Search
CPC ........ G03B 15/06; G03B 15/02; G03B 15/05; F21V 11/00; F21V 11/02; F21V 11/064; F21V 11/065
USPC ............................................ 362/3–18; 396/4
See application file for complete search history.

(56) References Cited

U.S. PATENT DOCUMENTS

| | | |
|---|---|---|
| 757,012 A | 4/1904 | Bell |
| 927,965 A | 7/1909 | Gruber |
| 1,223,163 A | 4/1917 | Graham |
| 1,906,559 A | 5/1933 | Ferree et al. |
| 2,033,235 A | 3/1936 | Ferree et al. |
| 2,055,862 A | 9/1936 | Friedman |
| 2,398,799 A | 4/1946 | Miller |
| 2,607,885 A | 8/1952 | Pfister et al. |

(Continued)

FOREIGN PATENT DOCUMENTS

| | | |
|---|---|---|
| DE | 102008007007 | 8/2009 |
| DE | 202009010094 | 2/2010 |

OTHER PUBLICATIONS

Lighttools, Lighttools Soft Egg Crates and Stretch Frames User Guide, all pages, Apr. 18, 2012.*

(Continued)

*Primary Examiner* — Alexander K Garlen
*Assistant Examiner* — Colin J Cattanach
(74) *Attorney, Agent, or Firm* — Robert J. Lauson; Lauson & Tarver LLP

(57) ABSTRACT

A light control grid has a collapsible frame having an outer flexible band with straight sides supported by flexible strips, where each side is sewn to an adjacent side to form an enclosed polygonal perimeter, and the sewn junctions of the adjacent sides form pockets. Intersecting sets of flexible light control strips are sewn by the ends to the inner side of the flexible band to form light channels. A tape spring is inserted into a flexible sheath assembly for each side of the outer band, with each end inserted into the two pockets for that side, where slits near the end of each light control strip provide clearance for the sheath assembly to be inserted therethrough. Optionally a central flexible light control strip is replaced with a bracing cross member extending across the polygonal perimeter.

15 Claims, 4 Drawing Sheets

(56) References Cited

U.S. PATENT DOCUMENTS

| | | | | |
|---|---|---|---|---|
| 2,665,784 A * | 1/1954 | Lacy | ................ | F21V 11/00 |
| | | | | 362/290 |
| 2,702,596 A | 2/1955 | Morrow | | |
| 3,446,955 A | 5/1969 | Bailey et al. | | |
| 3,628,007 A | 12/1971 | Rosenberg | | |
| 3,863,251 A | 1/1975 | Gould et al. | | |
| 4,428,412 A | 1/1984 | Toro | | |
| 4,524,405 A * | 6/1985 | Heard | ................ | G03B 15/02 |
| | | | | 362/18 |
| 4,731,715 A * | 3/1988 | Anderson | ............ | F21V 1/26 |
| | | | | 362/352 |
| 4,825,921 A | 5/1989 | Rigter | | |
| 4,841,947 A | 6/1989 | Johnson | | |
| 5,024,262 A | 6/1991 | Huang | | |
| 5,235,497 A | 8/1993 | Costa | | |
| 5,241,799 A | 9/1993 | Jahn | | |
| 5,267,599 A | 12/1993 | Kim | | |
| 5,556,186 A * | 9/1996 | Pilby | ................ | F21V 11/02 |
| | | | | 362/16 |
| 5,701,939 A | 12/1997 | Pinto | | |
| 6,152,580 A | 11/2000 | Babuka | | |
| 6,161,893 A | 12/2000 | Ewing | | |
| 6,273,368 B1 | 8/2001 | Zheng | | |
| 6,309,076 B1 | 10/2001 | McVicker | | |
| 6,648,396 B2 * | 11/2003 | Monahan | ........... | B60J 1/2011 |
| | | | | 160/370.21 |
| 6,705,338 B2 | 3/2004 | Zheng | | |
| 6,719,157 B2 | 4/2004 | Stoddart | | |
| 7,063,428 B2 * | 6/2006 | Lowe | ................ | G03B 15/06 |
| | | | | 135/125 |
| 7,114,766 B2 | 10/2006 | Becher | | |
| 7,140,376 B2 | 11/2006 | Zheng | | |
| D537,957 S | 3/2007 | Pilby | | |
| 7,198,388 B2 * | 4/2007 | Pilby | ................ | E04B 9/00 |
| | | | | 362/325 |
| 7,236,695 B1 * | 6/2007 | Demos | ............... | G03B 15/06 |
| | | | | 16/241 |
| 7,347,019 B1 | 3/2008 | Shaw | | |
| 7,609,949 B2 | 10/2009 | Ealer | | |
| 8,014,654 B2 * | 9/2011 | Karle | ................ | F21V 17/06 |
| | | | | 396/4 |
| 8,070,006 B2 | 12/2011 | Austin | | |
| 8,307,602 B2 | 11/2012 | Cochran, Jr. | | |
| 8,579,447 B2 | 11/2013 | Pilby | | |
| 2001/0009513 A1 | 7/2001 | Geller | | |
| 2003/0147568 A1 | 8/2003 | Edwards | | |
| 2004/0226490 A1 * | 11/2004 | Polumbaum | ........ | B65D 19/0093 |
| | | | | 108/56.1 |
| 2005/0005497 A1 | 1/2005 | Boltan | | |
| 2006/0007666 A1 | 1/2006 | Cook | | |
| 2007/0285337 A1 | 12/2007 | Maddock | | |
| 2010/0124068 A1 * | 5/2010 | Karle | ................ | F21V 17/06 |
| | | | | 362/433 |
| 2010/0203780 A1 * | 8/2010 | Hobbs | ............... | B63C 9/26 |
| | | | | 441/80 |
| 2010/0319270 A1 | 12/2010 | Slade | | |
| 2011/0292634 A1 * | 12/2011 | Pilby | ................ | G03B 15/07 |
| | | | | 362/16 |
| 2016/0291447 A1 * | 10/2016 | Branham | ............ | G03B 15/06 |

OTHER PUBLICATIONS

Lighttools, Assembly for Lighttools Stretch Frames and Soft Egg Crates user guide, all pages, Apr. 29, 2012.*

"Snapgrids for Frost & Gel Frames," Youtube.com, published on Jun. 28, 2012, https://www.youtube.com/watch?v=a1AtTftc0Dk.*

"DoPchoice Snapgrid for Kino Flo 4 Banks," Youtube.com, published on Jun. 28, 2012, https://www.youtube.com/watch?v=5Gte64v5RLA.*

"DoPchoice Snapgrid for Chimera Softboxes," Youtube.com, published on Apr. 25, 2012, https://www.youtube.com/watch?v=n-k3gNuPqzY.*

Snapshot of "DoPchoice Snapgrid for Chimera Softboxes" for publication date verification.*

Kiteworks, Explorations in kite building and Flying, Maxwell Eden.
Supplies for the Modern Kite Builder, Kite Studio 5555 Hamilton Blvd. Wescosville, PA 18106, kbiferrl@fast.net.
The Ultimate Kite Book, A catalog of Kites, Paul & Helene Morgan.
Lighttools Stretch Frames Brochure.

* cited by examiner

FLEXIBLE LIGHT CONTROL GRID WITH COLLAPSIBLE FRAME

BACKGROUND

Applicant originated the category of collapsible light control grids in his U.S. Pat. No. 5,556,186. Such light control grids for photographer's soft boxes are generally made of intersecting and interlocking strips of fabric, formed in two sets, strips of one set intersecting the strips of the other set. The strips of intersecting sets are slotted in a complimentary manner and inserted one through the other to define a plurality of light channels. Alternatively, the control grid may be created by sewing the adjoining corners of fabric light channels. Applicant is also the inventor of light control grid for close up work in U.S. Pat. No. 8,579,447, and light control grids for architectural applications in U.S. Pat. Nos. 7,198,388 and D537,957.

A standard prior art photographic setup using the light control grid is shown in FIG. 1. To create soft light conditions, a light source (20), "soft box," or lightbox with a square or polygonal aperture (30) forming a reflective enclosure around the lamp is used. A light control grid (26) is mounted within the square aperture to cast light upon a desired subject (22) and scene (28), such that a photo may be taken with the camera (24).

Since the light control grid (26) is made of flexible fabric strips and must be inserted into flexible fabric lightbox aperture (30), it can be difficult to attach to the soft box (20). Further, once the control grid (26) is installed within the aperture (30), the fabric strips of the light grid often deflect or sag, which is especially an issue with larger soft boxes.

Others attempted to solve this issue by creating a flexible frame made from two L-shaped frame members made from tape springs that together enclose a rectangular perimeter for supporting the flexible grid within. The tape springs are inserted into long sleeves and bent to form two of the four corners of the control grid. The other two corners are formed by sewing together the free ends of the L-shaped frame members, so that two diagonally arranged corners are sewn and the other two diagonally arranged corners are formed by bending the tape spring. The tape springs are metal strips biased to a straight configuration due to being bent about the longitudinal axis, but may be bent or rolled along its length.

The L-shaped tape springs are at times difficult to open to a rectangular configuration, as the tape spring frame may bend at any point, as the two tape spring corners may be slightly difficult to discover. Additionally, the grid, while being supported at the edges, remains unsupported across the center, which may sag, especially if a large grid.

What is needed is a light control grid with a frame that can be collapsed and folded in the assembled state, and expanded to a rectangular or polygonal shape where the corners are easily discoverable, such that the light control grid readily conforms to the rectangular aperture of a soft box. Also finding a way to better support the center portion of large grids would be advantageous.

SUMMARY

The present light control grid provides an easy-to-use collapsible frame having an outer flexible band with three or more straight sides supported by flexible strips, where each side is sewn to an adjacent side at each end to form an enclosed polygonal perimeter. Each of the sewn junctions of two adjacent sides forms the bottom of two pockets opening towards their respective side's midpoint. Intersecting sets of flexible light control strips are sewn by the ends to the inner side of the flexible band to form a plurality of light channels. At least one tape spring is inserted into a flexible sheath assembly provided for each side of the outer band, with each terminus of each sheath assembly being inserted into the two pockets of its respective side, where slits near the end of each light control strip provide clearance for the sheath assembly to be inserted through. Optionally, one or more of the light control strips may be sewn into a sheath with a tape spring inserted within to provide a bracing cross member at a point away from the perimeter.

In an optional embodiment, the present collapsible light control grid comprises an outer band made of a flexible material and having a plurality of sides connected end-to-end to define a polygonal opening with a first corner and a second corner adjacent to the first corner. Further, a first pocket is formed at the first corner and a second pocket is formed at the second corner. A frame member is held to the outer band due to the frame member spanning between the first pocket and the second pocket, with the frame member being at least partially inserted within each of the first pocket and the second pocket. And, a plurality of flexible strips intersect to define a multiplicity of light channels within the polygonal opening.

In yet another optional embodiment, the collapsible light control grid has a first side, a second side, a third side, and a fourth side. The first corner is formed by the sewing of the first side to the second side; the second corner is formed by the sewing of the second side to the third side; a third corner is formed by the sewing of the third side to the fourth side; and a fourth corner is formed by the sewing of the fourth side to the first side.

Further optionally, the plurality of flexible strips has a first series of strips and a second series of strips; where the second series of strips planarly intersecting the first series of flexible strips to define the multiplicity of light channels.

Again optionally, each of the first series of strips has a first terminus and a first opposing terminus; where the first terminus is connected to the first side of the outer band and the first opposing terminus is connected to the third side of the outer band, with the first series of strips spanning the polygonal opening. And, each of the second series of strips has a second terminus and a second opposing terminus; where the second terminus is connected to the second side of the outer band and the second opposing terminus is connected to the fourth side of the outer band, with the second series of strips spanning the polygonal opening.

As yet another option, a first slit may be formed at the first terminus of each of the first series of strips and a first opposing slit may be formed at the first opposing terminus of each of the first series of strips. And, a second slit may be formed at the second terminus of each of the second series of strips and a second opposing slit may be formed at the second opposing terminus of each of the second series of strips.

In another alternate embodiment, the frame member is positioned alongside the first side of the outer band, a second frame member is positioned alongside the second side of the outer band, a third frame member is positioned alongside the third side of the outer band, and a fourth frame member is positioned alongside the fourth side of the outer band.

Alternatively, the frame member may be inserted through the first slit at the first terminus of each of the first series of strips and the third frame member may be inserted through the first opposing slit at the first opposing terminus of each of the first series of strips. And, the second frame member may be inserted through the second slit at the second terminus of each of the second series of strips and the fourth frame member may be inserted through the second opposing slit at the second opposing terminus of each of the second series of strips.

Further optionally, the first pocket may be formed at the first corner alongside the second side and the second pocket may be formed at the second corner alongside the second side.

Yet again, optionally, a third pocket is formed at the first corner alongside the first side and a fourth pocket is formed at the fourth corner alongside the first side. A fifth pocket is formed at the fourth corner alongside the fourth side and a sixth pocket is formed at the third corner alongside the fourth side. And, a seventh pocket is formed at the third corner alongside the third side and an eighth pocket is formed at the second corner alongside the third side.

Optionally, at least one of the plurality of flexible strips is a bracing cross member extending across the polygonal opening, the bracing cross member having a tape spring inserted within a sheath. And, the frame member may be removably held to the outer band and may be removed by deflecting the frame member and withdrawing the frame member from the first pocket and the second pocket.

In an alternate embodiment, the collapsible light grid comprises an outer band with a plurality of flexible outer strips connected end-to-end to define a polygonal opening; a first pocket and a second pocket formed on each flexible outer strip of the plurality of outer strips, the first pocket is situated separately from the second pocket, where the first pocket and the second pocket opening towards one another. A frame member is inserted within both of the first pocket and the second pocket of each outer strip of the plurality of outer strips for providing greater rigidity to each of the outer strips. And, a plurality of flexible inner strips intersect to defining a multiplicity of light channels within the polygonal opening.

As an option, an end of each flexible outer strip of the plurality of flexible outer strips is folded over and attached to itself to four at least one of the first pocket and the second pocket. The frame member may be removable from the first pocket and the second pocket by deflecting the frame member and withdrawing the frame member from the first pocket and the second pocket. At least one of the plurality of flexible inner strips is a bracing cross member, where the bracing cross member has a tape spring inserted within a sheath.

DETAILED DESCRIPTION

Figure 1:
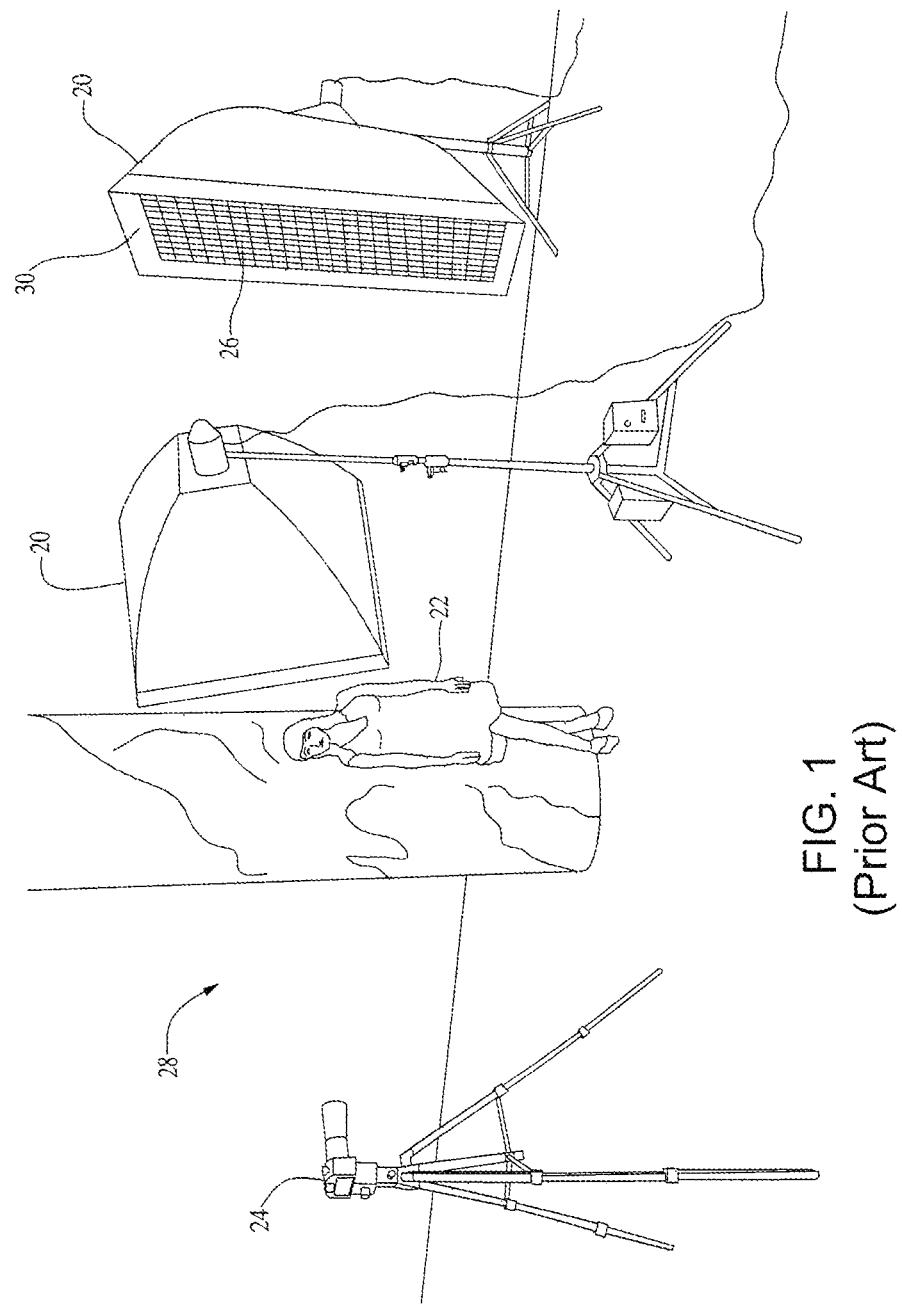
FIG. 1 is a perspective view of a prior art photography scene, showing a standard collapsible light control grid within a soft box, where the soft box is compatible with the present light control system.
Figure 2:
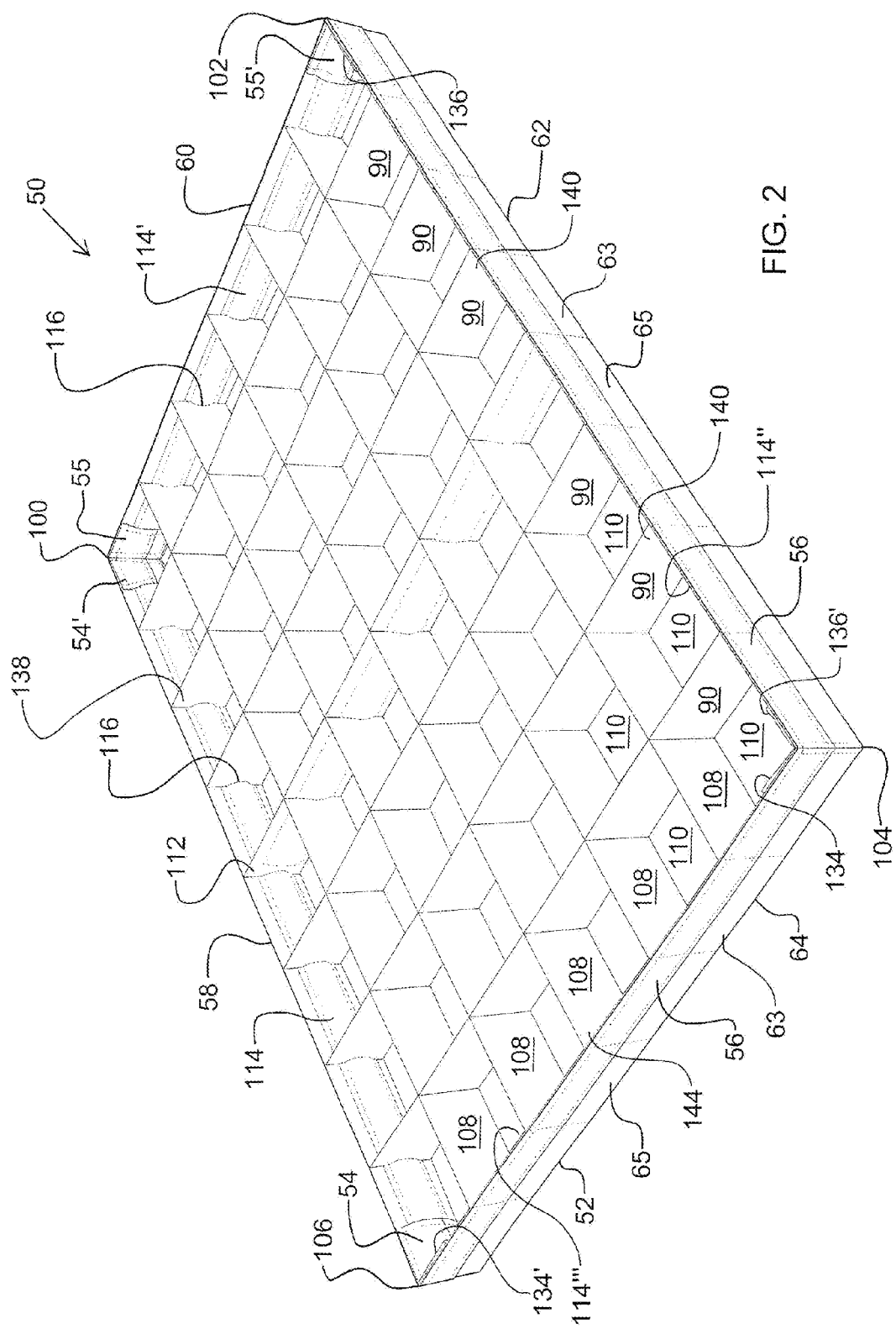
FIG. 2 is a perspective assembled view of the preferred embodiment of the present light control grid.
Figure 3:
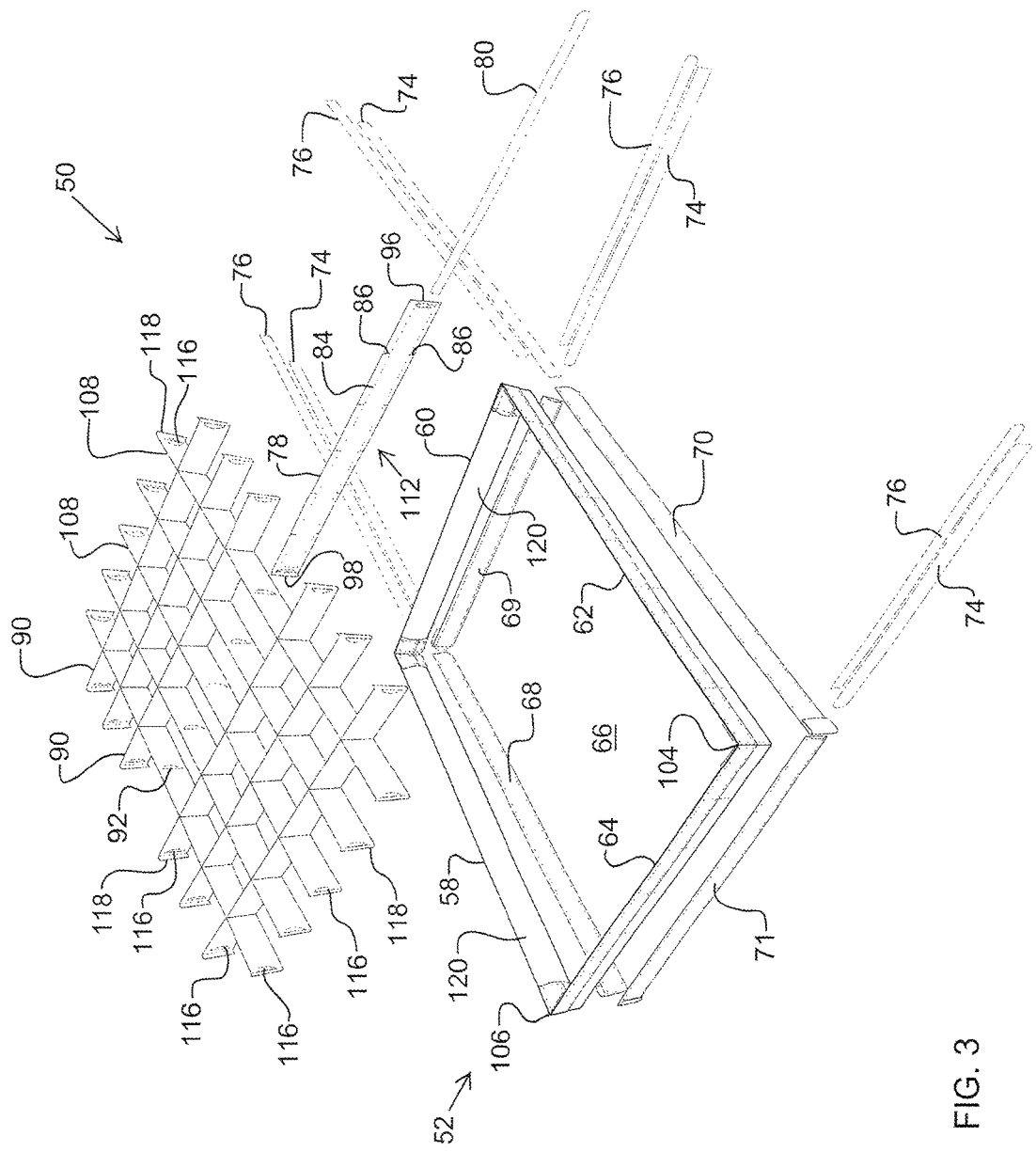
FIG. 3 is a perspective exploded view of the preferred embodiment of the present light control grid.

Referring to the illustrated assemblies of FIGS. 2-3, an example embodiment of an improved light control grid (50) is illustrated. The present light control grid (50) has an outer band (52) that defines the rectangular or polygonal shape of the outer perimeter of the light control grid (50). The outer band (52) may be manufactured by cutting an elongated strip of fabric material to form the side (58, 60, 62, 64). The sides (58, 60, 62, 64) may be approximately 2" wide, but will vary according to the lighting requirements. In the illustrated embodiment, each side (58, 60, 62, 64) is made with a 2" wide hook and loop fastener strip (56), preferably the hook side of the fastener is used. Approximately half the width of the fastener strip (56) is covered with a vinyl (63) or similar fabric material to permit comfortable handling and improve appearance. The ends of the sides (58, 60, 62, 64) are sewn together to form sewn junctions (100, 102, 104, 106). Of course, the sides (58, 60, 62, 64) can be joined at the ends by any appropriate method, including stapling, gluing, heat sealing, and the like. For example, the end of side (58) is sewn to the end of side (60) to form sewn junction (100).

Preferably, the ends of each side (58, 60, 62, 64) are folded over and sewn at the edge to form a pocket (54, 54', 55, 55') that opens towards the midpoint of that pocket's respective side and the bottom of the pocket (54, 54', 55, 55') forms the sewn junction (100, 102, 104, 106). For example, the ends of side (58) are folded over and inward to form pockets (54 and 54'). Thus, on inner side (120) of the outer band (52), eight pockets are formed, with two at each sewn junction of adjacent sides (58, 60, 62, 64), which includes a first pocket (55), a second pocket (555, a third pocket (54'), a fourth pocket (54), a fifth pocket (134'), a sixth pocket (134), a seventh pocket (136'), and an eighth pocket (136). An opening (66) is defined by the connection of the four sides (58, 60, 62, 64) of the outer band (52).

Within the opening (66) is a first series of parallel fabric strips (90) intersecting a second series of parallel fabric strips (108) to form a plurality of light channels (110). In the illustrated example, the first series (90) is arranged perpendicular to the second series (108). The first series (90) is threaded through slits (92) cut at intervals through each strip in the second series (108); and each strip of the second series (90) has snipped notches (86) cut at intervals along both edges that align with corresponding slits (92) so that the snipped notches (86) rest within the slits (92). The fabric strips are made of light absorbing or light reflecting material. Preferably the material is black, light absorbing material.

To secure the intersecting assembly of the first (90) and the second (108) series of flexible strips to the outer band (52), the ends (the first terminus 138 and the first opposing terminus 140 on the first series 90 and the second terminus 142 and the second opposing terminus 144 on the second series 108) of each strip within the first (90) and the second (108) series is sewn to the inner side (120) of the outer band (52). In this way, when the outer band (52) is arranged in a rectangular perimetral shape, the first (90) and the second (108) series of fabric strips will intersect at right angles to form rectangular light channels (110). Although the illustrated example shows the first (90) and the second (108) series intersecting at right angles, they may intersect at angles greater than or less than ninety degrees, to form parallelogram-like light channels.

One or more of the strips in one or both of the first (90) and the second (108) series of flexible strips may be replaced with a bracing cross member (112) with one or more tape springs (80) inserted into a sheath (78), so that the tape spring (80) is completely covered by the light absorbing material of the sheath (78). In this way, the bracing cross member (112) supports the light control grid created by the first (90) and the second (108) series of intersecting flexible strips to prevent sagging or convex and concave bowing of the grid. The bracing cross member (112) is shown as a replacement for one of the first series (90) of strips. Alternatively, two or more of the first series (90) of strips can be replaced with bracing cross member (112). Further, one or more of the second series (108) of strips can be additionally replaced with bracing cross member (112), to provide bracing in perpendicular directions.

Figure 4:
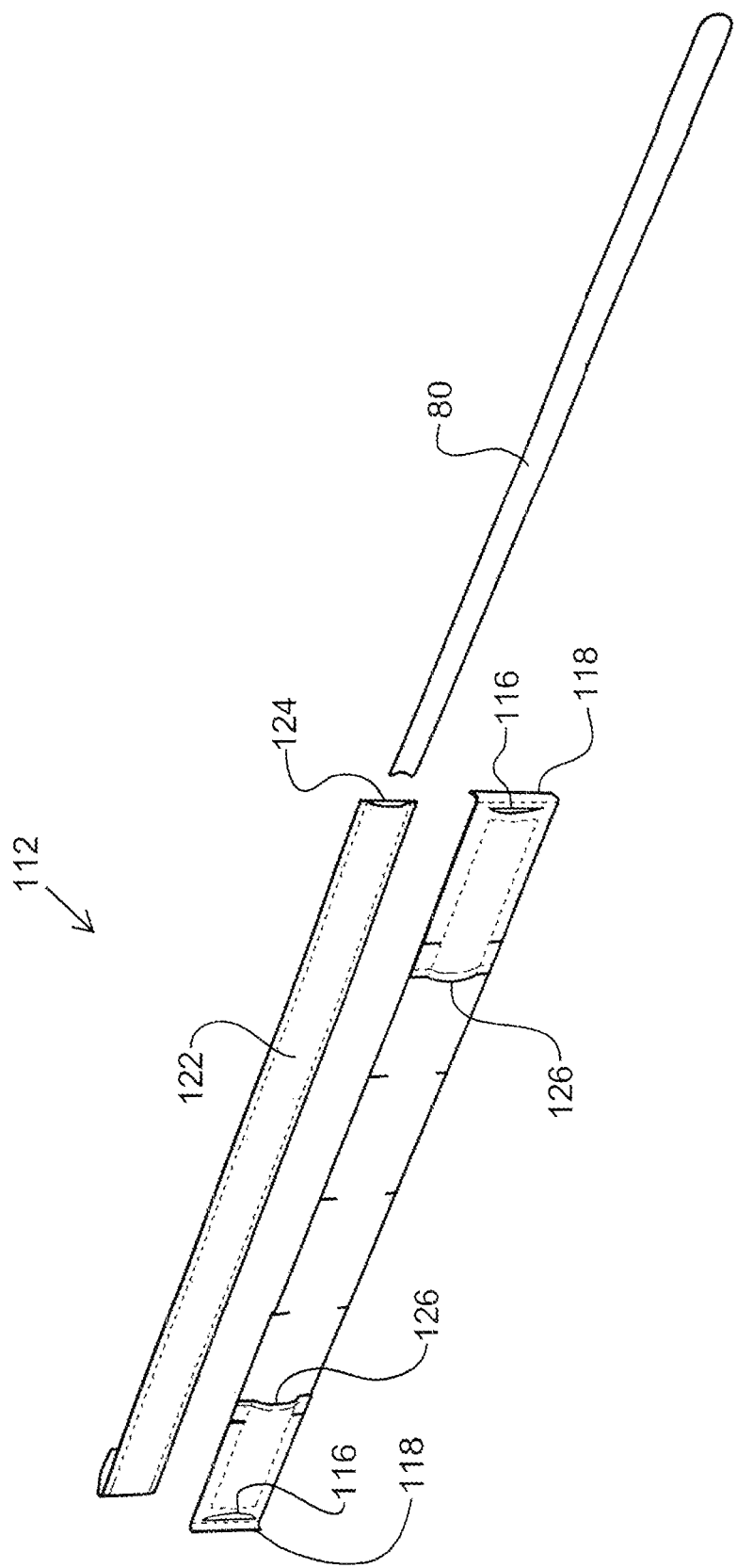
FIG. 4 is a perspective view of an alternate embodiment of bracing cross member of the present light control grid.

In the illustrated embodiment, the ends (96, 98) of the bracing cross member (112) are sewn to the inner side (120) of the outer band (52). One tape spring (80) is inserted into the sheath (78) through the opening at the end (96), and with snipped notches (86) cut at intervals, similar to the second series of strips (90). Top and bottom sewn seams (84) forms the sheath (78). In an alternate embodiment, the cross members (112) may be replaceable either whole or in-part. In one example, the tape spring (80) may be removed and replaced with a new tape spring, as the old tape spring (80) may become fatigued over time. In another example, two flaps with pockets (not shown) can be sewn to the inner side (120) of the outer band (52), where the ends (96, 98) can be inserted into the pockets; and the entire cross member (112) assembly can be replaced when the tape spring (80) has become worn. In yet another example illustrated in FIG. 4, the cross member (112) has a removable sheath (122) into which the tape spring (80) is inserted. The removable sheath (80) and the tape spring (80) together may be bent for insertion into the pockets (126) of a modified fabric strip (128) to form a bracing cross member assembly (112). The modified fabric strip (128) can permanently attached to the outer band (52) by sewing the tabs (118) to the inner side (120) of the outer band (52). Slits (116) are cut near the tabs (118) to provide clearance for insertion and removal of the perimeter frame members (114). Thus, when the tape spring (80) becomes worn or breaks, a new tape spring can be inserted into the sheath (122) and easily inserted back into the pockets (126).

Four perimeter frame members (frame member 114, second frame member 114', third frame member 114", and fourth frame member 114') are provided to create a semi-rigid frame along the inner side (120) of the rectangular outer band (52). Within each sheath (68, 69, 70, 71) of the perimeter frame members (114) one or more tape springs (74, 76) are inserted. To increase rigidity, two tape springs (74, 76) are inserted within the each of the sheaths (68, 69, 70, 71) with the concave or cupped faces of the tape springs (74, 76) facing towards each other. Yet, the resulting perimeter frame members (114) can be bent or rolled at any point, where the tape springs (74, 76) are biased to the straight configuration and can be resiliently deformed. There is one perimeter frame (114) for each side (58, 60, 62, 64) of the outer band (52). Thus, in this example, there are four perimeter frame members (114) to support a rectangular outer band (52).

The assembled perimeter frame members (114) are installed in the outer band (52) by inserting both ends of each perimeter frame member (114) into a respective pocket (54, 54', 55, 55') so that the pockets (54, 54', 55, 55') capture the perimeter frame member (114); and each perimeter frame member (114) provides a tensioning force on its respective side (58, 60, 62, or 64) of the outer band (52). In this example, four perimeter frame members (114), one for each side, provide tension and rigidity on each side (58, 60, 62, 64) of the outer band (52).

Near the ends of each of the first (90) and the second (108) series of fabric strips, where they are sewn to the inner side of the outer band (52), a slit (116) provides clearance to receive the perimeter frame members (114) inserted there through. When installing the frame members (114) to the outer band (52), the frame members (114) are threaded through each successive aligned slit (116) along one of the sides, for example side (58), and inserted into pockets (54 and 54'). In this way, the frame members (114) may be easily removed and exchanged with new frame members as the internal tape springs (74, 76) become worn or break.

The sewn junctions (100, 102, 104, 106) act as hinges, permitting the semi-rigid sides (58, 60, 62, 64) to freely pivot relative to one another, so that the sides (58, 60, 62, 64) may remain straight and semi-rigid, yet the inner fabric grid can be collapsed to a flat state. Once flattened, all of the tape springs (74, 76, 80) may be deformably bent so that the entire light control grid may be folded or rolled into a more compact configuration. Loop fastener straps (not shown) can be wrapped about the folded light control grid (50) to hold the folded configuration by attaching to the hook fastener strip (56) on the outer band (52).

To deploy the light control grid (50), the user simply unfolds it so that the perimeter frame members (114) expand to a straight configuration. In the straight configuration, the light control grid (50) is still collapsed, with the first (90) and the second (108) series of fabric strips stacked closely atop each other, as there is no bias to an expanded state. The user can pick the light control grid (50) up by one or two sides to expand the grid and open the light channels (110). Because the perimeter frame members (114) are semi-rigid in the expanded configuration and the sewn junctions (100, 102, 104, 106) act as hinged corners, the sides (58, 60, 62, 64) of the outer band (52) will remain straight and the outer band (52) will tend to bend at the sewn junctions (100, 102, 104, 106). Essentially, the bending will generally first occur at the soft hinges, while the sides remain straight. In this way, a rectangular shape will automatically be created by simply lifting and opening the light control grid (50).

After the light control grid (50) is deployed, it can be attached to the aperture of the soft box by attaching the strip of loop material (56) to a strip of hook material within the soft box or polygonal shape. To make the attachment of the present light control grid (50) to the aperture of a soft box, the user can partially expand the grid (50) to a rhombus or parallelogram shape (rather than the square or rectangular fully expanded shape). Then, the user directs an acute corner to one of the corners of the soft box, wedging the acute corner into the soft box corner. The user then expands an adjacent corner of the grid (50) into the corresponding corner of the soft box, connecting the hook and loop fasteners. Finally, the remaining corners of the grid (50) can easily be attached to their respective corners of the soft box. In this way, a single user can easily install a large light control grid (50) into a correspondingly large soft box aperture, without the grid (50) collapsing or becoming unwieldy.

The present collapsible light control grid provides all of the advantages of collapsible grids, while easily expanding into a rectangular shape with well-defined corners. The hinged corners freely pivot and are designed to generally bend before the tape springs within the semi-rigid sides fold. The user can quickly attach the light control grid to a large soft box by holding two sides and lifting it into the soft box to attach the hook and loop fasteners.

What is claimed is:
1. A collapsible light control grid for attachment to an opening of a light source, the collapsible light control grid comprising:
  an outer band made of a flexible material and having a plurality of sides connected end-to-end to define a polygonal opening with a first corner and a second corner adjacent to the first corner, the outer band having an inner side;

a first pocket being formed at the first corner and a second pocket being formed at the second corner;

a frame member held to the outer band due to the frame member spanning between the first pocket and the second pocket, the frame member being at least partially inserted within each of the first pocket and the second pocket; and a plurality of flexible strips intersecting to define a multiplicity of light channels within the polygonal opening, wherein each of the plurality of flexible strips comprises a slit formed in at least one terminus thereof, wherein the plurality of flexible strips are connected to the inner side of the outer band between the first corner and the second corner by the at least one terminus;

wherein the frame member is inserted through each slit of the plurality of flexible strips between the first pocket and the second pocket.

2. The collapsible light control grid of claim 1, wherein: the plurality of sides comprises a first side, a second side, a third side, and a fourth side; and the first corner is formed by the sewing of the first side to the second side, the second corner is formed by the sewing of the second side to the third side, a third corner is formed by the sewing of the third side to the fourth side, and a fourth corner is formed by the sewing of the fourth side to the first side.

3. The collapsible light control grid of claim 2, wherein the plurality of flexible strips comprises a first series of strips and a second series of strips, the second series of strips planary intersecting the first series of flexible strips to define the multiplicity of light channels.

4. The collapsible light control grid of claim 3, wherein: each of the first series of strips has a first terminus and a first opposing terminus, the first terminus being connected to the first side of the outer band, the first opposing terminus being connected to the third side of the outer band, with the first series of strips spanning the polygonal opening; and each of the second series of strips has a second terminus and a second opposing terminus, the second terminus being connected to the second side of the outer band, the second opposing terminus being connected to the fourth side of the outer band, with the second series of strips spanning the polygonal opening.

5. The collapsible light control grid of claim 4, wherein: a first slit is formed at the first terminus of each of the first series of strips and a first opposing slit is formed at the first opposing terminus of each of the first series of strips; and a second slit is formed at the second terminus of each of the second series of strips and a second opposing slit is formed at the second opposing terminus of each of the second series of strips.

6. The collapsible light control grid of claim 5, wherein the frame member is positioned alongside the first side of the outer band, a second frame member is positioned alongside the second side of the outer band, a third frame member is positioned alongside the third side of the outer band, and a fourth frame member is positioned alongside the fourth side of the outer band.

7. The collapsible light control grid of claim 6, wherein: the frame member is inserted through the first slit at the first terminus of each of the first series of strips and the third frame member is inserted through the first opposing slit at the first opposing terminus of each of the first series of strips; and the second frame member is inserted through the second slit at the second terminus of each of the second series of strips and the fourth frame member is inserted through the second opposing slit at the second opposing terminus of each of the second series of strips.

8. The collapsible light control grid of claim 7, wherein the first pocket is formed at the first corner alongside the second side and the second pocket is formed at the second corner alongside the second side.

9. The collapsible light control grid of claim 8, wherein: a third pocket is formed at the first corner alongside the first side and a fourth pocket is formed at the fourth corner alongside the first side;

a fifth pocket is formed at the fourth corner alongside the fourth side and a sixth pocket is formed at the third corner alongside the fourth side; and a seventh pocket is formed at the third corner alongside the third side and an eighth pocket is formed at the second corner alongside the third side.

10. The collapsible light control grid of claim 3, wherein at least one of the plurality of flexible strips comprises a bracing cross member, the bracing cross member comprising a tape spring inserted within a sheath.

11. The collapsible light control grid of claim 1, wherein the frame member is removably held to the outer band and may be removed by deflecting the frame member and withdrawing the frame member from the first pocket and the second pocket.

12. A collapsible light control grid for attachment to an opening of a light source, the collapsible light control grid comprising:

an outer band comprising a plurality of flexible outer strips connected end-to-end to define a polygonal opening, the outer band having an inner side;

a first pocket and a second pocket being formed on each flexible outer strip of the plurality of outer strips, the first pocket being separated from the second pocket, the first pocket and the second pocket opening towards one another;

a frame member inserted within both of the first pocket and the second pocket of each outer strip of the plurality of outer strips for providing greater rigidity to each of the outer strips; and a plurality of flexible strips intersecting to define a multiplicity of light channels within the polygonal opening, wherein each of the plurality of flexible strips comprises a slit formed in at least one terminus thereof, wherein the plurality of flexible strips are connected to the inner side of the outer band between the first corner and the second corner by the at least one terminus;

wherein the frame member is inserted through each slit of the plurality of flexible strips between the first pocket and the second pocket.

13. The collapsible light control grid of claim 12, wherein an end of each flexible outer strip of the plurality of flexible outer strips is folded over and attached to itself to form at least one of the first pocket and the second pocket.

14. The collapsible light control grid of claim 12, wherein the frame member is removable from the first pocket and the second pocket by deflecting the frame member and withdrawing the frame member from the first pocket and the second pocket.

15. The collapsible light control grid of claim 12, wherein at least one of the plurality of flexible inner strips comprises a bracing cross member, the bracing cross member comprising a tape spring inserted within a sheath.

* * * * *